United States Patent [19]

Berman et al.

[11] Patent Number: 4,918,711

[45] Date of Patent: Apr. 17, 1990

[54] METHOD FOR IMPROVE X-RAY DIFFRACTION DETERMINATIONS OF RESIDUAL STRESS IN NICKEL-BASE ALLOYS

[75] Inventors: Robert M. Berman; Isadore Cohen, both of Pittsburgh, Pa.

[73] Assignee: The United States of America as represented by the United States Department of Energy, Washington, D.C.

[21] Appl. No.: 186,422

[22] Filed: Apr. 26, 1988

[51] Int. Cl.$^4$ ............................................. G01N 23/20
[52] U.S. Cl. ........................................ 378/72; 378/71; 428/328; 252/961; 106/287.18
[58] Field of Search ............... 106/97, 287.18; 378/71, 378/72, 75, 80, 207; 252/961; 428/328

[56] References Cited

U.S. PATENT DOCUMENTS

| | | | |
|---|---|---|---|
| 2,389,641 | 11/1945 | Sarbach et al. | 428/328 |
| 2,406,428 | 8/1946 | Luckhaupt | 106/287.18 |
| 3,051,586 | 8/1962 | Heath et al. | 428/328 |
| 3,320,082 | 5/1967 | McMahon et al. | 106/287.18 |
| 3,475,213 | 10/1969 | Stow | 428/328 |
| 3,934,138 | 1/1976 | Bens | 378/72 |
| 4,042,825 | 8/1977 | Rund | 378/72 |
| 4,125,771 | 11/1978 | Erwin | 378/72 |
| 4,385,095 | 5/1983 | Jenkins | 378/207 |
| 4,561,062 | 12/1985 | Mitchell | 378/72 |

OTHER PUBLICATIONS

"Preparation of Reference Standards for the X-Ray Spectral Analysis of Powdered Materials" by Shestakov et al., Translated from Zavodskayu Laboratoriya, vol. 41, pp. 948-950, 8/1975.

*Primary Examiner*—Craig E. Church
*Assistant Examiner*—John C. Freeman
*Attorney, Agent, or Firm*—William R. Moser; Judson R. Hightower; Richard E. Constant

[57] ABSTRACT

A process for improving the technique of measuring residual stress by x-ray diffraction in pieces of nickel-base alloys which comprises covering part of a predetermined area of the surface of a nickel-base alloy with a dispersion, exposing the covered and uncovered portions of the surface of the alloy to x-rays by way of an x-ray diffractometry apparatus, making x-ray diffraction determinations of the exposed surface, and measuring the residual stress in the alloy based on these determinations. The dispersion is opaque to x-rays and serves a dual purpose since it masks off unsatisfactory signals such that only a small portion of the surface is measured, and it supplies an internal standard by providing diffractogram peaks comparable to the peaks of the nickel alloy so that the alloy peaks can be very accurately located regardless of any sources of error external to the sample.

7 Claims, 2 Drawing Sheets

PEAK SHIFT IN AN ALLOY 625 C-RING DUE TO RESIDUAL STRESS

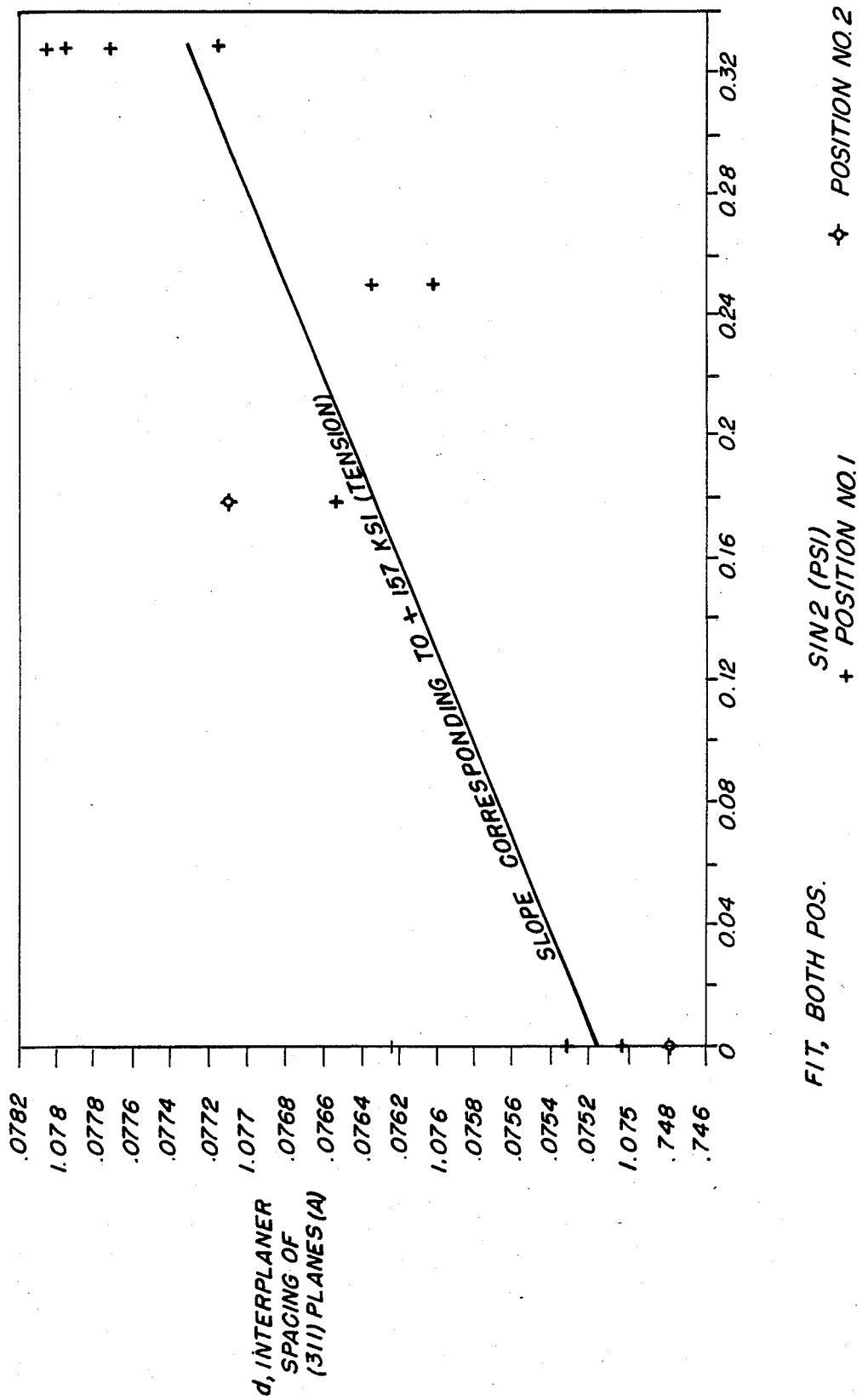

METHOD FOR IMPROVE X-RAY DIFFRACTION DETERMINATIONS OF RESIDUAL STRESS IN NICKEL-BASE ALLOYS

BACKGROUND OF THE INVENTION

The present invention relates to a method for measuring residual stress in nickel-base alloys by x-ray diffraction.

X-ray diffraction is used to determine residual strain by employing the atomic lattice as a strain gage. The spacing of a particular set of atomic planes in this lattice is measured by observing the angles at which diffracted monochromatic x-rays are detected. In typical techniques with macroscopic strain gages, it is possible to determine the difference in extension between the loaded and unloaded conditions. In x-ray diffraction, however, it is not appropriate to determine the difference between a separate, unstrained sample of a metal, e.g. an annealed powder, and the metal that forms part of a work piece of interest. This is due to the fact that the interatomic spacing is very sensitive to small chemical differences, such as those that would occur between the two samples, and the resulting differences in spacing would be far greater than those brought about by the strain.

Accordingly, it is the typical practice to use the same sample of metal, but in two different orientations, for the two necessary measurements. Typically, this sample is a small portion of metal at some location in the surface of a work piece believed to be subject to residual elastic strain. If, within the same small incremental volume of metal, the spacing varies with direction, this is an indication of the presence of strain.

A first measurement is taken of the spacing of planes normal to the sample surface. This measurement is made at the sample position used for routine diffraction work, and the position represents the geometry providing optimum resolution and accuracy. The process differs from routine diffraction work primarily in that only a single peak, at a very high diffraction angle, is examined. The positions of such peaks are very sensitive to small changes in spacing. For the second measurement, it is necessary to turn the sample such that the surface no longer is in the plane specified by this optimum geometry.

This procedure introduces various errors external to the sample, resulting in observable shifts in diffractogram peaks and a loss of peak intensity and resolution. In an attempt to eliminate these errors, mathematical corrections based on empirical models are applied to the results.

Another source of error in the measurement may arise from the use of curved sample surfaces, such as in U-bends. The strain condition of such pieces is often specifically of interest, or chosen for testing purposes. In these cases, only a small part of the surface is in the proper plane for accurate x-ray diffraction measurement; any other portion of the surface that contributes to the signal detracts from the accuracy, the resolution, and the validity of the mathematical corrections.

It is therefore desirable to incorporate into this method of diffraction determination an additional material which when measured is comparable to the sample, so as to create an internal standard. This standard material would be known to be unstrained. Thus, any shift in the peak diffractogram position caused by rotating the standard material and the sample could be attributed to errors external to the sample, since precisely the same errors would apply to both the additional material and the sample. Further, such a standard material would desirably be available in very pure form and have exceptionally sharp diffractogram peaks subject to accurate determination. It is also desirable that the diffractogram peak of the standard material be close to the peak of the sample for which a measurement is desired, and yet not so close as to interfere with the sample's peak. In such a case, the measurement would take the form of observing the changes in the differences in position between the sample and standard material peaks.

It is therefore also desirable to use only a minimum portion of the surface which can produce a satisfactory diffraction signal so as to minimize variability of results and to eliminate or mask off the unsatisfactory signals caused by other portions of the surface with a material that is relatively opaque to x-rays.

SUMMARY OF THE INVENTION

Therefore, it is an object of this present invention to create an internal standard in a method for measuring residual stress in nickel-base alloys which will overcome the above noted disadvantages.

Another object of the present invention is to provide a method for measuring the residual stress of the minimum amount of nickel-base alloy surface that is capable of giving good results by utilizing a material that is opaque to x-rays so as to eliminate or mask off unsatisfactory signals in the measurement process.

A further object of the present invention is to provide a material which is used as an internal standard for measuring residual stress in nickel-base alloys and is used to eliminate or mask off unsatisfactory signals in the measurement process so that a minimum amount of the alloy surface capable of giving good results is measured.

Still, another object of the present invention is to provide an adequate, reliable method of monitoring residual stress in nickel-base alloys that may have both nuclear and non-nuclear applications as, for example, in certifying the effectiveness of stress annealing procedures.

The foregoing objects and others are accomplished in accordance with the present invention, generally speaking, by employing a method for measuring residual stress in nickel-based alloys which comprises covering part of a predetermined area of the surface of a nickel-base alloy with a standard material, exposing the covered and uncovered surfaces of the alloy to x-rays, making x-ray diffraction determinations of these surfaces, and measuring the residual stress in the alloy based on the determinations.

The present invention utilizes a standard material such as a dispersion useful in x-ray diffraction determinations which comprises pure, fully-annealed tungsten powder dispersed in a dispersing medium, such as Duco Cement, Cab-o-Sil silica, or similar cementing mediums. The grain size of the tungsten may be from about 5 to 30 microns and the content of the tungsten powder in the dispersion may be from about 5 to 20 volume percent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is further illustrated in the accompanying drawings wherein:

FIG. 2 is a plot of interplanar spacing "d" against $\sin^2 \psi$ for a D2W X-750 corner cell bolt component.

DETAILED DESCRIPTION OF THE INVENTION

Figure 1:
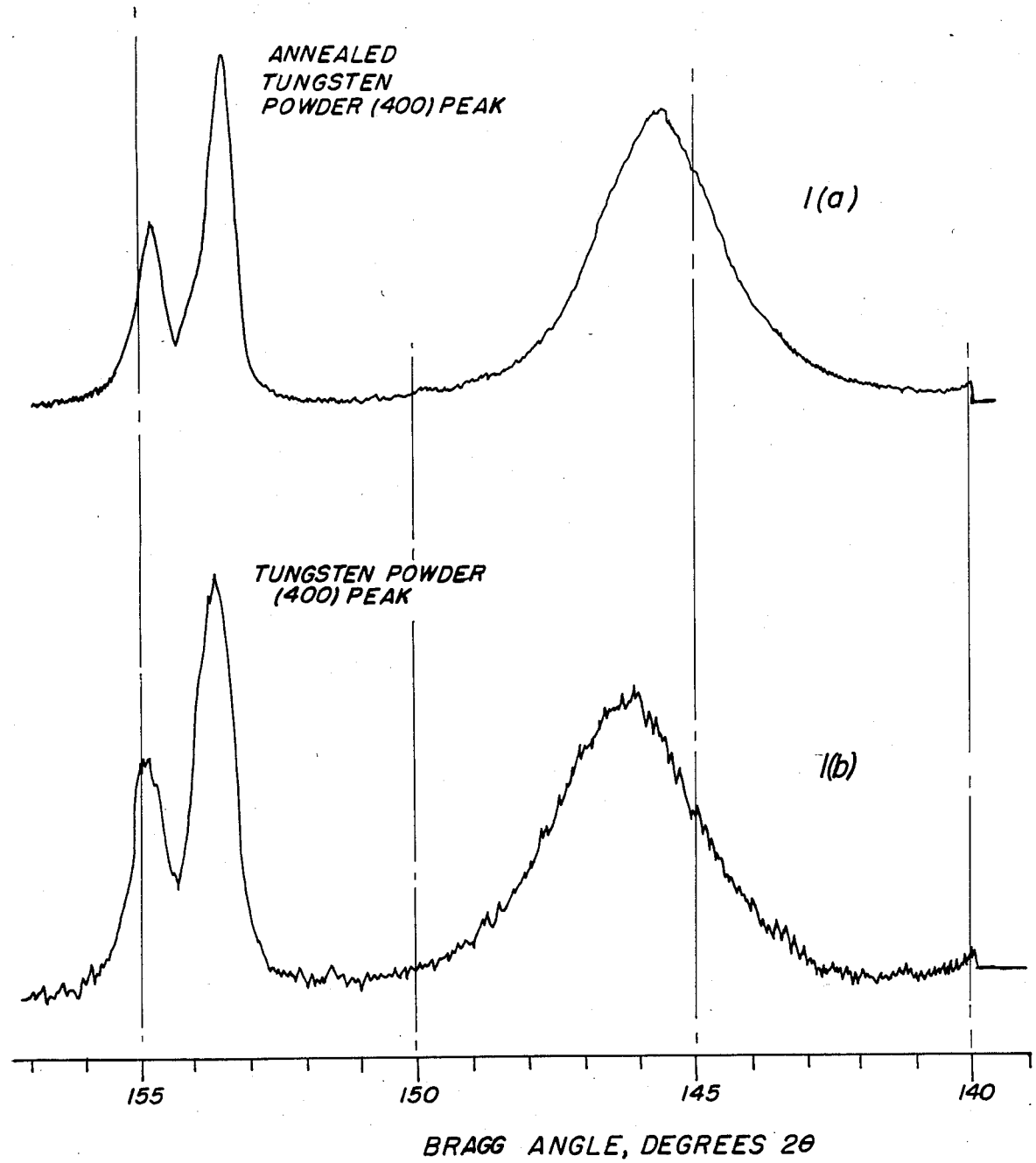
FIG. 1(a) is a diffractogram of a nickel-base alloy sample depicting a tungsten powder (400) peak, i.e. an internal standard peak, on the left and a nickel-base alloy peak on the right. The sample position is as it would be in routine diffractometry work so as to provide optimum resolution and accuracy.
FIG. 1(b) is a diffractogram of the same sample as in FIG. 1(a), except that the sample has been rotated to a non-standard position which is 52.4 degrees removed from the sample position in FIG. 1(a). Again, the tungsten powder (400) peak is depicted on the left and the nickel-base alloy peak on the right.

According to the present invention, the residual stress of nickel-base alloys is measured through the use of x-ray diffraction techniques. The method according to the invention utilizes a standard material which, in addition to the nickel-base alloy, is exposed to x-rays for x-ray diffraction determination. In order to carry out the method, this standard material is first placed on a predetermined area of the surface of the nickel-base alloy. Then a portion of the surface covered by the standard material and a portion not covered by the material are exposed to x-rays by way of an x-ray diffractometry apparatus. After making x-ray diffraction determinations, the nickel-base alloy may be re-oriented and again exposed to x-rays for further diffraction determinations. The diffraction determinations are compared in order to measure residual stress in the alloy.

The standard material employed should be unstrained, available in pure form and should exhibit a diffractogram peak subject to accurate determination. Preferably the diffractogram peak is sharp and is close to the alloy's peak, yet not so close as to interfere with the alloy's peak. This standard material should also be relatively opaque to x-rays so as to eliminate or mask off unsatisfactory signals caused by portions of the surface outside the proper plane for diffraction determinations. Any suitable material may be used as the standard material for the purpose defined. A standard material which fulfills the above requirements is a dispersion, such as a dispersion containing tungsten powder. Other standard materials which fulfill the above requirements include CaO, MgO, $CaF_2$, and Si.

Preferably, if a dispersion of tungsten powder is used, the powder should be pure and fully annealed. The size of the tungsten powder should be in the range of from about 5 to 30 microns. Smaller grains may result in broader peaks while larger grains may result in irregular peak profiles. Further, the powder should preferably be dispersed in an amount of from about 5 to 20 volume percent in the dispersing medium. Larger amounts may interfere with the congealing of the cement, while smaller amounts may result in low-intensity standard peaks.

The dispersing medium contemplated for a dispersion of the present invention may, for example, be Duco Cement, Cab-o-Sil fused silica, amorphous petroleum products of the "Apiezon" series, or a similar cementing medium.

The standard material employed in the present invention is used to cover a predetermined area of the surface of the nickel-base alloy such that only a minimum portion of the surface necessary for the diffraction determination will be exposed for examination by x-rays. This uncovered area may be from about 10 to about 50 sq. mm depending upon the diffractometry technique employed.

Any suitable nickel-base alloy may be measured through the use of the x-ray diffraction techniques of the present invention. The nickel-base alloys may have curved surfaces, such as a C-ring of Alloy 625, the generic name of an alloy (one of the Inconel series) developed by Inco for the nuclear industry. Other examples of nickel-base alloys include Alloy 600, Alloy 690, other Inconel alloys, and pure nickel.

A glass slide may be used to place the material on the alloy surface so that only a small portion of the uncovered surface, approximately tangent to the glass slide, is exposed for examination by x-rays.

The x-ray diffractometry apparatus employed in the invention includes diffractometry apparatuses known to those skilled in the art such as the Phillips, Scintag, Rigaker, Siemens, or other model general-purpose x-ray diffractometers.

PREFERRED EMBODIMENTS

To further define the specifics of the present invention the following examples are intended to illustrate and not limit the particulars of the present invention.

EXAMPLE I

A supply of pure, fully-annealed, tungsten powder is obtained from Fisher Scientific Co. (Lot 790832). This supplier may have exhausted this particular lot. Material currently being supplied may be substituted by determining the position of its (400) peak with precision comparable to the following. This lot's cell size was measured as 3.16509 angstroms at room temperature. The (400) peak of this lot of tungsten, in copper K-alpha 1 x-radiation, occurs at a Bragg Angle of 152.52 degrees (2 Theta). The peak of the nickel-base alloys that is normally measured is also the (400) peak of those substances, and its apex, depending on the alloy, is between 149 and 151 degrees. This peak typically changes in position by two or three tenths of a degree between the two measurement positions; the difference between the peak and that of the tungsten (which will not change) will therefore undergo a large fractional change, which can be accurately determined. The tungsten peak may appear in the high-angle flank of a broad nickel peak; however, standard techniques of reconstruction and separation of the profiles will permit accurate determinations.

The tungsten powder is dispersed in one of the aforementioned media. Using a glass slide, the dispersion is placed on the curved nickel-base alloy surface of a C-ring of Alloy 625 as previously defined. The dispersion is placed on the surface so that only a small portion of the surface, about 10–20 sq. mm., that is approximately tangent to the glass slide is exposed for examination by x-rays. A standard x-ray diffractometry apparatus is employed, as previously defined. Since tungsten has a high atomic number, the dispersion is essentially opaque to x-rays. The sample is initially exposed to x-rays for examination in the same position as in routine diffractometry work with a psi angle of zero degrees. The resulting diffractogram is depicted in FIG. 1(a). The sample is then rotated, such that the psi angle is 52.4 degrees, and again exposed to x-rays for examination. The resulting diffractogram is depicted in FIG. 1(b).

In order to calculate the residual stress measurements, calculations are performed based on the above x-ray diffraction determinations using standard mathematical techniques known to those skilled in the art. If the residual stress measurements are calculated and the internal tungsten standard is ignored, the resulting measurement is 60 ksi and is subject to a standard error of about 18 ksi. If the tungsten internal standard is taken into account in accordance with the present invention, the resulting residual stress determination is 76 ksi with a standard error of 8 ksi.

EXAMPLE II

Residual stress measurements were taken on a D2W X-750 corner cell bolt component which failed in a four year stress corrosion cracking test. All of the measurements performed were circumferential or "hoop" stresses from the machined surface.

Four sets of runs were made in this examination. The first two sets were made using psi angles for each set whereas the second two sets were made using the two-angle technique. The first three sets were made in the same exact location without manually moving the bolt between runs. This location is located roughly 3¼ inches up from the hollow end of the bolt. The fourth set runs were made in a location approximately 120° from the first position at about the same distance along the bolt length. After collecting the data from the first two sets, changes were made in the running parameters to improve intensity and counting statistics. The counting time was increased from 1.2 seconds to 10 seconds at each point. As a result, the data obtained from the second two sets is considered to be significantly more reliable than the data collected from the first two sets. Note that normally a psi angle of at least 45° is used, since increasing the psi angle maximizes sensitivity but, in this case, the intensity was too low so that the maximum psi angle used was 35°.

Initially, a scan of the specimen using Copper, K-alpha radiation, from 40° to 145° two-theta, indicated that the best matrix peak for the analysis, i.e. the highest two-theta peak of sufficient intensity, was the (311) reflection located at approximately 91.5°. Pure tungsten powder was used as an internal standard to correct for any extraneous shifts in peak position caused mainly by misalignment of either the specimen, as mounted, or the goniometer used. The tungsten powder was mixed with Vaseline petroleum jelly and painted in a very thin layer over the areas to be analyzed. The (200) tungsten reflection was chosen since it was located nearest to the (311) matrix peak, and was known to have a proper and correct position of 87.00° two-theta when all corrections are made. To improve the intensity for the runs in the last two sets, the tungsten standard was painted only on the top and bottom sections of the irradiated area, leaving a stripe in the center for which the underlying bolt material was not covered. Because the fine tungsten particles should be virtually free of any lattice strain, and assuming the alignment conditions were perfect, the tungsten peak position should theoretically remain constant at 87.00° for the various psi angles. Any variation from this location can therefore be attributed to the combined effect of errors of various sorts. The position of the nearby sample peak could therefore be corrected by assuming the same errors.

All of the measurements from the various runs were collected, corrected through the use of the tungsten internal standard, and subjected to linear regression analysis. This procedure found the best value of the slope of a straight line characterizing a plot of the interplanar distance d against $\sin^2$ psi. This plot is illustrated in FIG. 2. This slope, when multiplied by $E/(1+)$, where E is the modulus of elasticity which is 31100 ksi for this material, and is Poisson's Ratio which is 0.29 for this material, gives the value of the residual stress, in ksi, together with the standard deviation of the measurement. The value determined for the hoop stress at the locations examined is $+157 \pm 31$ ksi, the positive value indicating that the surface material is in tension. X-ray diffraction determinations are representative only of material at the surface or immediately beneath, e.g. a few micrometers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring residual stress in nickel-base alloys comprising:
   providing a nickel-base alloy for measurements;
   covering part of a predetermined area of the surface of said nickel-base alloy with a standard material, wherein the standard material exhibits characteristic x-ray diffraction determinations such that these determinations may be compared to those of the nickel-based alloy in order to provide an internal standard, wherein said standard material is capable of eliminating or masking off unsatisfactory diffraction signals, wherein the standard material is a dispersion and contains pure, fully-annealed tungsten powder dispersed in a medium selected from the group consisting of Duco Cement, Cab-o-Sil fused silica, and amorphous, semi-solid petroleum products, wherein the grain size of the tungsten powder is from about 5 to 30 microns, wherein the content of the tungsten powder in the dispersion is from about 5 to 20 volume percent, and wherein a glass slide is used to place the dispersion on the surface of said alloy so as to partially cover a predetermined area of said surface;
   exposing covered and uncovered surfaces of said alloy to x-rays by way of an x-ray diffractometry apparatus;
   making x-ray diffraction determinations of said surfaces; and
   measuring the residual stress in said alloy based on said determinations.

2. A method as in claim 1, wherein at least two different portions of the surface of the nickel-base alloy are exposed to x-rays for x-ray diffraction determinations and these determinations then compared to x-ray diffraction determinations of the standard material in order to measure residual stress of said alloy.

3. A method for measuring residual stress in nickel-base alloys comprising:
   providing a nickel-base alloy for measurements;

covering part of a predetermined area of the surface of said nickel-base alloy with a standard material, wherein the standard material consists of tungsten powder dispersed in a dispersing medium;

exposing covered and uncovered surfaces of said alloy to x-ray diffraction determinations of said surfaces; and measuring the residual stress in said alloy based on said determinations.

4. A method as in claim 3, wherein the dispersing medium is selected from the group consisting of Duco Cement, Cab-o-Sil fused silica, and amorphous, semi-solid petroleum products.

5. A method as in claim 3, wherein the grain size of the tungsten powder is from about 5 to 30 microns.

6. A method as in claim 3, wherein the content of the tungsten powder in the dispersion is from about 5 to 20 volume percent.

7. A method for measuring residual stress in nickel-base alloys comprising:

providing a nickel-base alloy for measurement;

covering part of a predetermined area of the surface of said nickel-base alloy with a dispersion of pure, fully-annealed tungsten powder;

exposing a first portion of covered and uncovered surfaces of said alloy to x-rays by way of an x-ray diffractometry apparatus;

making x-ray diffraction determinations for said first portion;

re-orienting said alloy surface;

exposing a second portion of covered and uncovered surfaces of said alloy to x-rays by way of an x-ray diffractometry apparatus;

making x-ray diffraction determinations for said second portion; and measuring the residual stress in said alloy based on a comparison of the x-ray diffraction determinations for said first and second portions.

* * * * *